United States Patent

Williams et al.

[11] Patent Number: 5,508,481
[45] Date of Patent: Apr. 16, 1996

[54] STEERING WHEEL WITH HORN SWITCH ASSEMBLY

[75] Inventors: Duane D. Williams, Beavercreek; Paul M. Landis, Englewood, both of Ohio

[73] Assignee: General Motor Corporation, Detroit, Mich.

[21] Appl. No.: 402,246

[22] Filed: Mar. 10, 1995

[51] Int. Cl.⁶ ............................................. H01H 9/00
[52] U.S. Cl. ............................ 200/61.54; 200/61.53; 280/731
[58] Field of Search ................. 200/61.54, 61.55, 200/61.56; 280/727, 728.1, 728.2, 731, 728.3; 74/484

[56] References Cited

U.S. PATENT DOCUMENTS

| | | | |
|---|---|---|---|
| 4,785,144 | 11/1988 | Fosnaugh et al. | 200/61.55 |
| 4,789,763 | 12/1988 | Nagata et al. | 200/61.54 |
| 4,808,776 | 2/1989 | Niwa et al. | 200/61.55 |
| 4,963,704 | 10/1990 | Buma et al. | 200/61.55 |
| 5,005,860 | 4/1991 | Mori et al. | 280/731 |
| 5,085,461 | 2/1992 | Shibata | 280/731 |
| 5,087,069 | 2/1992 | Corbett et al. | 280/731 |
| 5,207,544 | 5/1993 | Yamamoto et al. | 411/348 |
| 5,283,404 | 2/1994 | Prescaro, Jr. | 200/61.54 |
| 5,333,897 | 8/1994 | Landis et al. | 280/728.2 |
| 5,350,190 | 9/1994 | Szigethy | 280/728.2 |
| 5,380,037 | 1/1995 | Worrell et al. | 280/728.2 |
| 5,410,114 | 4/1995 | Furuie et al. | 200/61.55 |
| 5,459,294 | 10/1995 | Danielson | 200/61.54 |

*Primary Examiner*—J. R. Scott
*Attorney, Agent, or Firm*—Saul Schwartz

[57] ABSTRACT

A motor vehicle steering wheel having a horn switch assembly including a module mounting plate on the steering wheel, a pair of horn contact plates attached to the module mounting plate in plug-in fashion, an occupant restraint module including a module base plate, and a plurality of electrically insulating plastic retainers. Each of the plastic retainers has a plurality of short legs received in keyhole slots in the module base plate and a plurality of long legs received in keyhole slots in the horn contact plates. When the retainers are twisted to locked positions, hooks on the short legs clamp the retainers to the module base plate. In the locked positions of the plastic retainers, the long legs cooperate with the keyhole slots in the horn contact plates in supporting the module base plate on the horn contact plates for in and out movement through a horn sounding stroke. Springs nested in the plastic retainers urge relative separation between the module base plate and the horn contact plates. An inner end of the horn sounding stroke is defined by engagement of the module base plate on the horn contact plates. Hooks on the ends of the long legs arrest relative separation between horn contact plates and the module base plate to define an outer end of the horn sounding stroke of the module base plate.

6 Claims, 4 Drawing Sheets

STEERING WHEEL WITH HORN SWITCH ASSEMBLY

FIELD OF THE INVENTION

This invention relates to motor vehicle steering wheels.

BACKGROUND OF THE INVENTION

U.S. Pat. No. 4,785,144, issued Nov. 15, 1988 and assigned to the assignee of this invention, describes a motor vehicle steering wheel having an inflatable occupant restraint module thereon including a module base plate, a bag and inflation apparatus, and a cover. A plurality of rigid posts on the module base plate cooperate with a plurality of bushing-lined socket holes in the steering wheel in mounting the module base plate on the steering wheel for in and out movement through a horn sounding stroke. The bushings are electrically insulating and each of the rigid posts is surrounded by a bell-shaped terminal which moves in and out with the module base plate. Springs between the module base plate and the steering wheel urge relative separation between the two. The bell-shaped terminals engage the steering wheel at one end of the horn sounding stroke of the module base plate when the occupant restraint module is pressed down to complete the horn circuit and sound the horn. In the opposite direction, enlarged heads on the rigid posts arrest relative separation between steering wheel and the module base plate and thereby define an outer end of the horn sounding stroke.

SUMMARY OF THE INVENTION

This invention is a new and improved motor vehicle steering wheel having a module mounting plate thereon, a pair of horn contact plates attached to the module mounting plate in plug-in fashion, and an occupant restraint module including a module base plate supported on the horn contact plates for in and out movement through a horn sounding stroke by a plurality of electrically insulating plastic retainers. Each of the plastic retainers has a plurality of oppositely extending legs thereon which plug into keyhole-shaped slots in the module base plate and in the horn contact plates. When the retainers are twisted to locked positions, hooks on the ends of legs in the slots in the module base plate clamp the retainers to the module base plate. Concurrently, the other legs on the retainers cooperate with the slots in the horn contact plates in supporting the module base plate on the horn contact plates for in and out movement through a horn sounding stroke. Springs nested in the plastic retainers urge relative separation between the module base plate and the horn contact plates. Dimples on the horn contact plates engage the module base plate at an inner end of the horn sounding stroke of the module base plate when the occupant restraint module is depressed against the springs to complete a horn circuit and sound a horn. In the opposite direction, hooks on the ends of the legs of the plastic retainers in the keyhole-shaped slots in the horn contact plates arrest relative separation between horn contact plates and the module base plate and thereby define an outer end of the horn sounding stroke of the module base plate.

DESCRIPTION OF A PREFERRED EMBODIMENT

Figure 1:
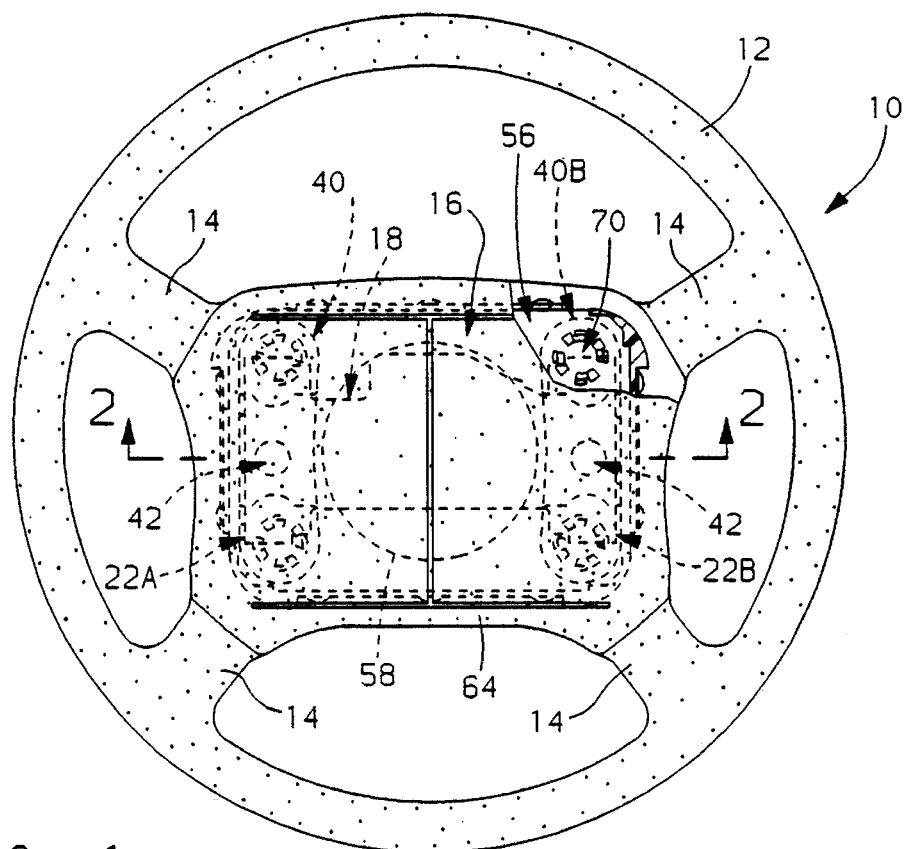
FIG. 1 is a plan view of a motor vehicle steering wheel according to this invention.

A motor vehicle steering wheel 10 according to this invention includes a padded rim 12, a center hub, not shown, a plurality of padded spokes 14, and an inflatable occupant restraint module 16 covering the hub. The hub is rigidly mounted on an outboard end, not shown, of a motor vehicle steering shaft in conventional fashion so that the steering shaft and the steering wheel 10 are rotatable as a unit.

As seen best in FIGS. 2–6, a module mounting plate 18 adapted for rigid attachment to the steering wheel 10 over the hub of the steering wheel includes a flat center portion 20 and a pair of integral, coplanar mounting pads 22A–22B on opposite sides of the center portion 20 raised from the plane of the center portion 20. Each of the mounting pads has a centrally located socket hole 24 and a pair of integral stops 26A–26B at opposite ends perpendicular to the plane of the mounting pads 22A–22B.

Each mounting pad 22A–22B has a spring latch 28 on the side of the mounting pad opposite the integral stops 26A–26B. As seen best in FIG. 6, each spring latch 28 includes a cover 30 staked or welded to the corresponding mounting pad 22A or 22B through a plurality of slots 32 in the mounting pad. Each cover 30 has a generally triangular opening 34 behind the corresponding socket hole 24. A spring 36 is captured in each cover 30 and includes a resilient arm 38 moveable parallel to the corresponding mounting pad 22A–22B and biased to a position projecting across the corresponding socket hole 24.

Each of a pair of horn contact plates 40A–40B has a centrally located rigid post 42 perpendicular to the plane of the horn contact plate and a pair of sockets 44 on opposite sides of the post 42. Each of the sockets 44 consists of a plurality of arc-shaped keyhole slots 46. Each keyhole slot has a big end 48 and small end 50. Each of the rigid posts has a keeper slot 52, FIG. 6, including a ramp side 54. The rigid posts 42 plug into respective ones of the socket holes 24 in the mounting pads 22A–22B on the module mounting plate 18.

Engagement of the stops 26A–26B integral with the mounting pads 22A–22B against the horn contact plates 40A–40B defines a mounted position of each of the horn contact plates on the module mounting plate 18 in which the keeper slots 52 on the posts 42 register with the spring arms 38 of the latch springs 36. The spring arms 38 bear against the ramp sides 54 of the keeper slots 52 to bias the horn contact plates firmly against the stops 26A–26B and to prevent dislodgement of the posts from the socket holes 24.

Figure 2:
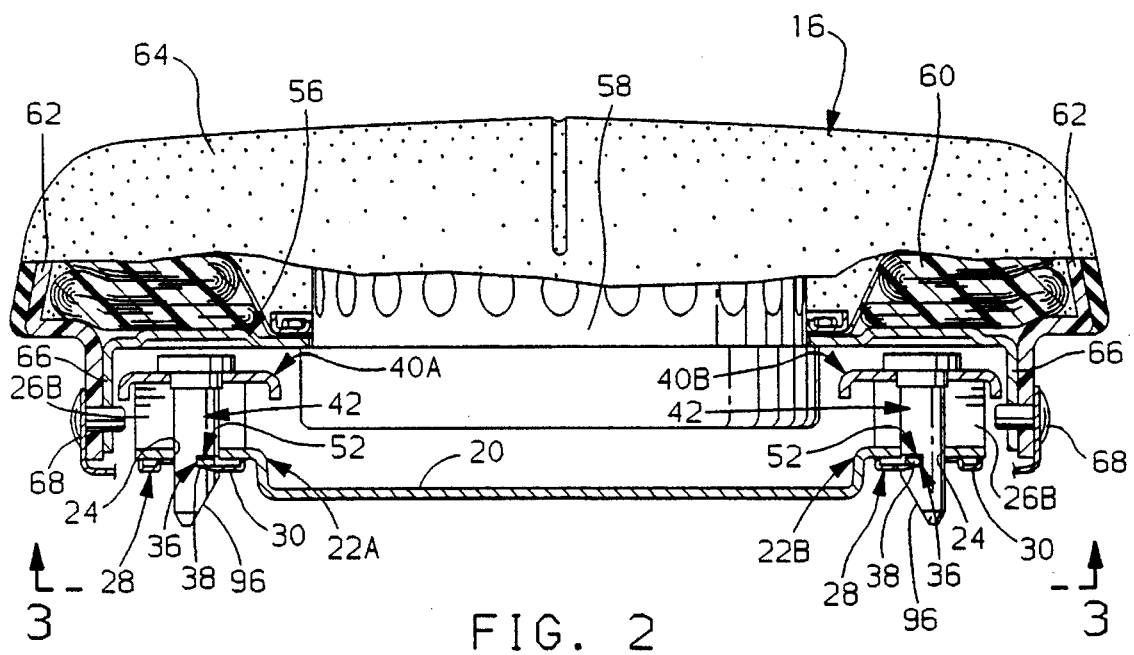
FIG. 2 is an enlarged sectional view taken generally along the plane indicated by lines 2—2 in FIG. 1.
Figure 3:
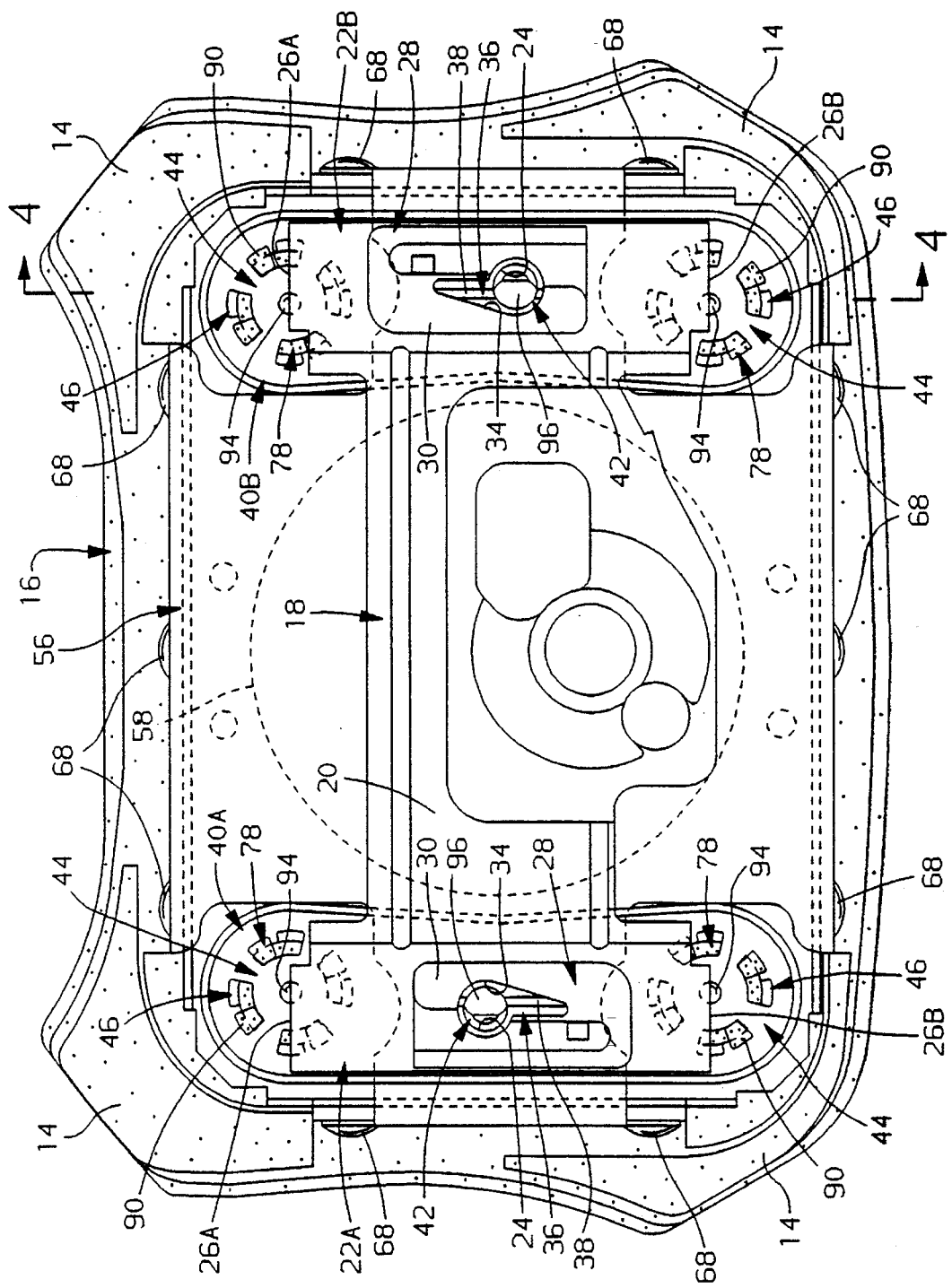
FIG. 3 is a view taken generally along the plane indicated by lines 3—3 in FIG. 2.
Figure 5:
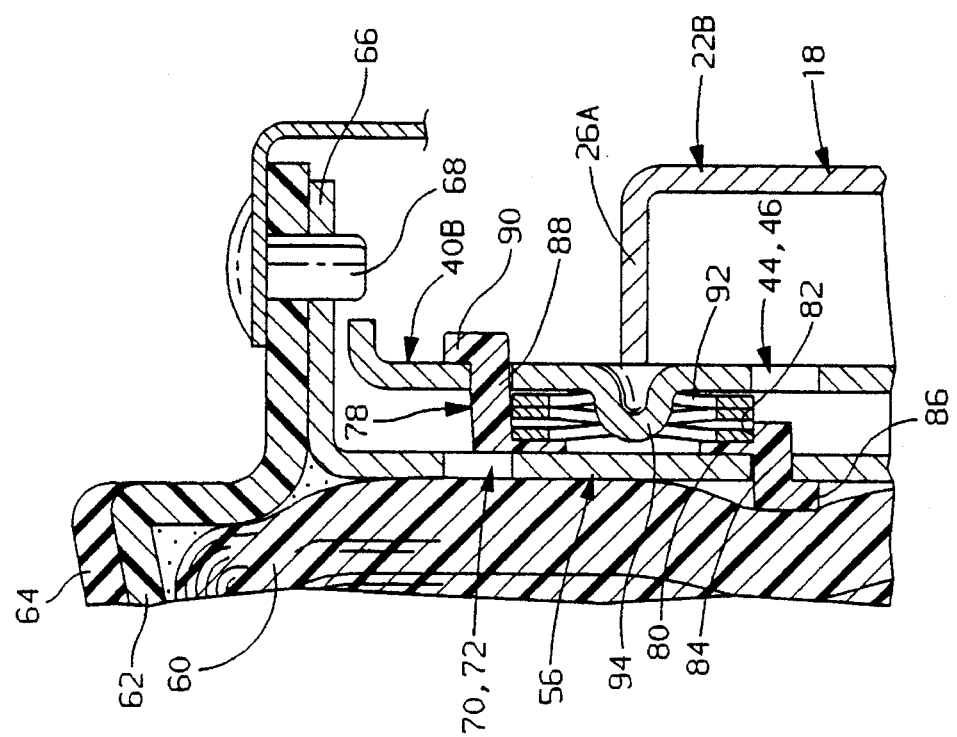
FIG. 5 is an enlarged view of a portion of FIG. 4.
Figure 4:
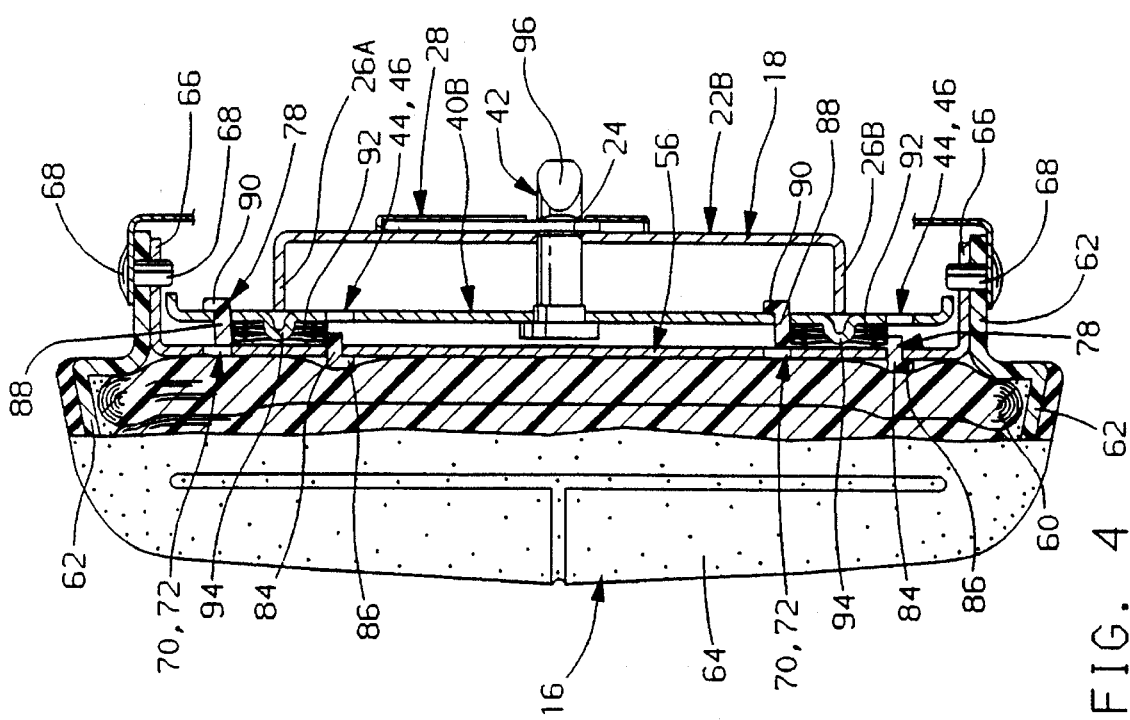
FIG. 4 is a sectional view taken generally along the plane indicated by lines 4—4 in FIG. 3.
Figure 6:
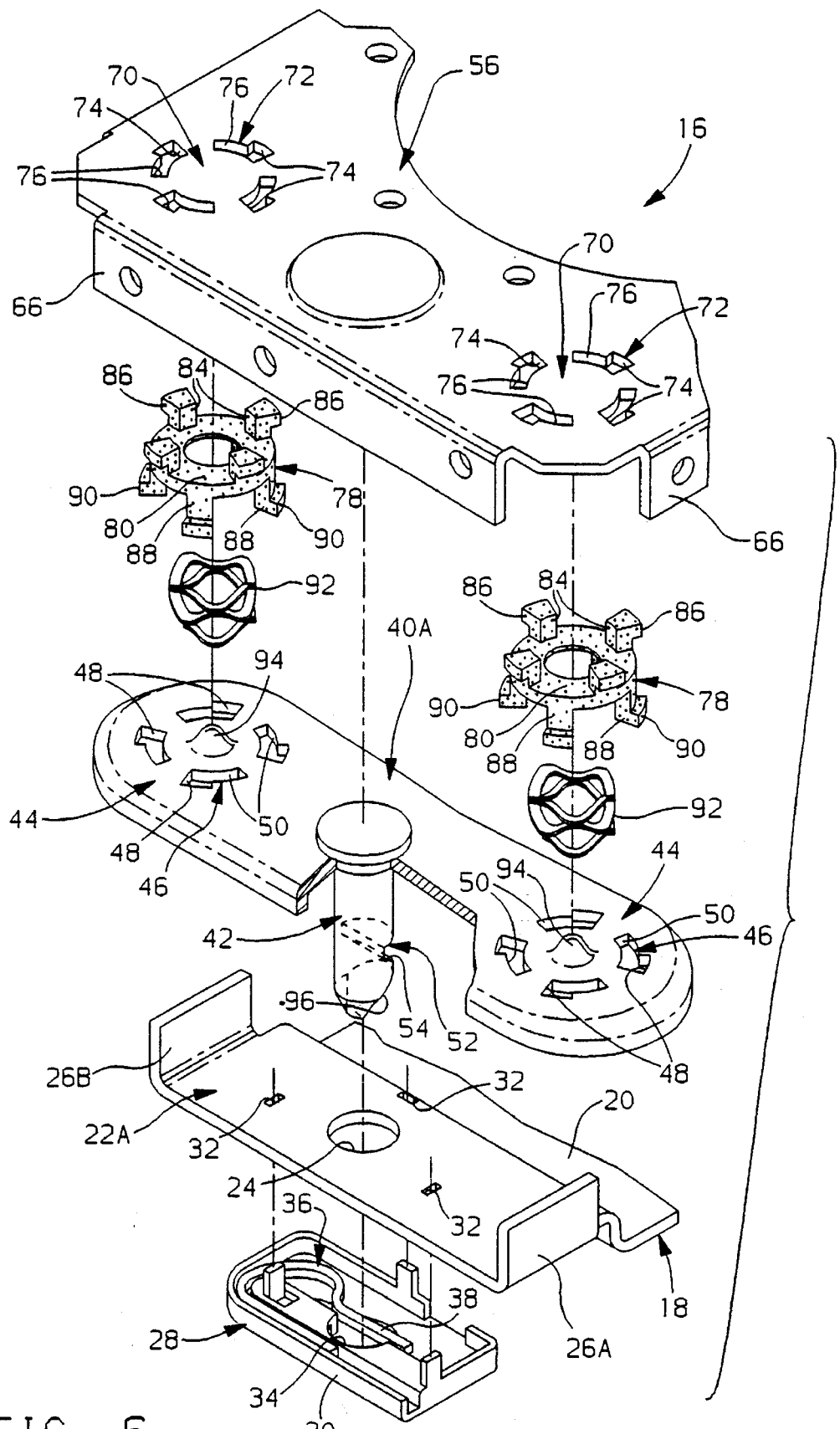
FIG. 6 is a fragmentary, exploded perspective view of the motor vehicle steering wheel according to this invention.

As seen best in FIGS. 2, 4 and 6, the occupant restraint module 16 includes a generally flat, rectangular base plate 56, an inflator 58 mounted on the module base plate 56, a folded bag 60 around the inflator, a container 62 around the bag, and a soft cover 64 around the container. The container 62 overlaps a plurality of flanges 66 on the sides of the module base plate 56 and is secured to the flanges by a plurality of fasteners 68. The module base plate has a plurality of sockets 70 each consisting of a plurality of arc-shaped keyhole slots 72. Each of the keyhole slots 72 has a big end 74 and a small end 76, FIG. 6.

The module base plate 56 is mounted on each of the horn contact plates 40A–40B for in and out movement through a horn sounding stroke by a plurality of electrically insulating plastic retainers 78. As seen best in FIGS. 5–6, each of the plastic retainers 78 includes a flat, disc-shaped center 80 having a counterbore 82 on one side of the center 80, a plurality of integral short legs 84 perpendicular to the center 80 on one side of the center 80 each having a hook 86 at a distal end, and a plurality of integral long legs 88 perpendicular to the center 80 on the opposite side of the center 80 from the short legs each having a hook 90 at a distal end. A barrel-shaped compression spring 92 is nested inside of the long legs 88 of each of the plastic retainers 78 and seats at one end in the corresponding counterbore 82.

The big ends 74 of the keyhole slots 72 constituting the sockets 70 in the module base plate 56 receive the short legs 84 on the plastic retainers 78. Concurrently, the big ends 48 of the keyhole slots 46 constituting the sockets 44 in the horn contact plates 40A–40B receive the long legs 88 on the plastic retainers 78. The ends of the springs 92 opposite the counterbores 82 seat on the horn contact plates around a corresponding one of a pair of dimples 94 on the horn contact plates in the middle of the sockets 44 and are compressed between the centers 80 of the plastic retainers and the horn contact plates. Each of the plastic retainers is twisted counterclockwise, FIG. 6, to a locked position, FIG. 3, in which the hooks 90 are lodged in the small ends 50 of the keyhole slots 46 in the horn contact plates 40A–40B. The hooks 86 are lodged in the small ends 76 of the keyhole slots 72 in the module base plate 56.

The above described installation of the plastic retainers 78 between the horn contact plates 40A–40B and the module base plate 56 is conducted before the rigid posts 42 on the horn contact plates are plugged into the socket holes 24 in the mounting pads 22A–22B. Importantly, after the posts 42 are plugged into the socket holes 24, the stops 26A–26B cover at least one of the keyhole slots 46 in each of the sockets 44 behind the corresponding one of the hooks 90 on the long legs 88 to positively prevent reverse rotation of the retainers 78 and release of the module base plate from the horn contact plates.

The length of each short leg 84 between its hook 86 and the center 80 of the plastic retainer is calculated to be about the same as the thickness of the module base plate 56 so that, in their locked positions, the plastic retainers are rigidly attached to the module base plate. Conversely, the length of each long leg 88 between its hook 90 and the center 80 of the plastic retainer exceeds the thickness of the horn contact plates 40A–40B so that, in the locked positions of the plastic retainers 78, the long legs 88 and the keyhole slots 46 cooperate in guiding the module base plate 56 for movement toward and away from the horn contact plates 40A–40B through a horn sounding stroke. An inner limit of the horn sounding stroke is defined by engagement of the module base plate on the raised dimples 94 through the centers 80 of the plastic retainers and the springs 92. An outer limit of the horn sounding stroke is defined by the hooks 90 on the long legs 88 which engage the horn contact plates and arrest relative separation between the horn contact plates and the module base plate.

The plastic retainers 78 prevent dislodgement of the module base plate 56 from the horn contact plates 40A–40B. The latches 28 prevent dislodgement of the horn contact plates 40A–40B from the module mounting plate 18 on the hub of the steering wheel 10. To sound the horn, force is applied to the soft cover 64 of the occupant restraint module 16 urging the module base plate 56 toward the horn contact plates. At the inner end of the horn sounding stroke, the module base plate engages the dimples 94 on the horn contact plates to complete a horn circuit, not shown, and sound the horn. When pressure on the soft cover 64 is relieved, the horn circuit is interrupted by the springs 92 which move the module base plate 56 in the opposite direction to the outer end of the horn sounding stroke defined by the hooks 90 on the long legs 88 of the plastic retainers 78.

To remove the occupant restraint module for service, a flat blade, e.g. the blade of a screw driver, is inserted in the triangular openings 34 in the covers 30 and twisted to flex the spring arms 38 out of the keeper slots 52 in the posts 42. The horn contact plates 40A–40B are then withdrawn from the socket holes 24 as a unit with the module base plate 56. Each of the rigid posts 42 has a cam end 96 for engaging the spring arms 38 when the occupant restraint module, with the horn contact plates connected to the occupant restraint module, is installed on the module mounting plate 56 in plug-in fashion. The cam ends 96 flex the spring arms 38 to positions permitting penetration of the posts 42 in the socket holes 24 to the mounted positions of the horn contact plates.

We claim:

1. A motor vehicle steering wheel comprising:

a module mounting plate rigidly attached to said steering wheel, a horn contact plate defining a first contact in a horn electrical circuit, a plug-in connecting means including a rigid post attached to one of said horn contact plate and said module mounting plate and a latch means attached to the other of said horn contact plate and said module mounting plate operative to rigidly attach said horn contact plate to said module mounting plate in response to said post being plugged into said latch means, an occupant restraint module including a module base plate defining a second contact in said horn electrical circuit, an electrically insulating plastic retainer attached to one of said horn contact plate and said module base plate, a socket means on the other of said horn contact plate and said module base plate slidably receiving said retainer and cooperating therewith in connecting said module base plate to said horn contact plate for movement relative to said horn contact plate through a horn sounding stroke having an inner end defined by engagement of said module base plate on said horn contact plate and an outer end defined by said plastic retainer, and a spring means biasing said module base plate toward said outer end of said horn sounding stroke.

2. The motor vehicle steering wheel recited in claim 1 wherein:

said electrically insulating plastic retainer includes a annular flat center, a plurality of short legs integral with said flat center projecting perpendicular to a first side thereof each having a hook at a distal end, and a plurality of long legs integral with said flat center projecting perpendicular to a second first side opposite said first side each having a hook at a distal end, and said socket means includes
- a first socket in said module base plate consisting of a plurality of arc-shaped keyhole slots each having a big end for receiving a corresponding one of said short legs and a small end receiving said corresponding one of said short legs when said retainer is twisted to a locked position in which said module base plate is captured between said flat center of said plastic retainer and said hooks at said distal ends of said short legs, and
- a second socket in said horn contact plate consisting of a plurality of arc-shaped keyhole slots each having a big end for receiving a corresponding one of said long legs and a small end slidably receiving said corresponding one of said long legs when said retainer is twisted to said locked position and cooperating with said corresponding one of said long legs in supporting said module base plate on said horn contact plate for movement through said horn sounding stroke, said outer end of said horn sounding stroke being defined by engagement of said hooks at said distal ends of said long legs on said horn contact plate.

3. The motor vehicle steering wheel recited in claim 2 wherein said spring means comprises:
- a cylindrical spring nested inside of said long legs on said plastic retainer having a first end seated on said flat center of said plastic retainer and a second end seated on said horn contact plate.

4. The motor vehicle steering wheel recited in claim 3 further comprising:
- a raised dimple on said horn contact plate projecting through said annular flat center of said plastic retainer for engagement on said module base plate at said inner end of said horn sounding stroke of said module base plate.

5. The motor vehicle steering wheel recited in claim 4 wherein:

said latch means includes
- a socket hole in said module mounting plate, and
- a spring having a resilient arm moveable parallel to said module mounting plate biased to a position obstructing said socket hole, and said rigid post is attached to said horn contact plate and includes a cam at a distal end operative to move said resilient arm out of said socket hole when said rigid post is inserted therein and a keeper slot aligned with and receiving said resilient arm when said horn contact plate achieves a mounted position on said module mounting plate.

6. The motor vehicle steering wheel recited in claim 5 further comprising:
- a stop on said module mounting plate engaging said horn contact plate to define said mounted position on said module mounting plate and operative in said mounted position of said horn contact plate to prevent reverse rotation of said plastic retainer from said locked position.

* * * * *